United States Patent Office 2,802,795
Patented Aug. 13, 1957

2,802,795

CELLULAR REACTION PRODUCTS OF TOLUENE DIISOCYANATE AND AN ALKYD RESIN

Eli Simon, Los Angeles, and Frank W. Thomas, Burbank, Calif., assignors to Lockheed Aircraft Corporation, Burbank, Calif.

No Drawing. Application October 10, 1952,
Serial No. 314,208

6 Claims. (Cl. 260—2.5)

This invention relates to foaming reactant polyisocyanate-alkyd resin compositions and to the products of reaction of the same and relates more particularly to such reactant compositions and to improved resins for incorporation therein.

Cellular plastics have, in the past, been prepared by reacting a polyisocyanate, an alkyd resin and certain additives. These additives, such as various high molecular weight thermoplastic polymeric resins, metallic soaps and metallic leafing powders, have been required and depended upon to act as foam stabilizing agents, etc. during the foaming reaction to obtain cellular plastic products of the desired cell structure, cell size and physical strength characteristics. We have discovered that by using certain bifunctional fatty acids in formulating the alkyd resins, to be incorporated in the foaming reactant mixtures, that cellular reaction products of excellent physical strength characteristics and of good uniform cell structure are obtained without requiring the employment of such additives.

It is, therefore, an object of our invention to provide simplified and improved reactant polyisocyanate-alkyd resin compositions for the production of cellular plastic products. In accordance with our present invention the reactant mixture which may be poured in place to react at atmospheric pressure and room temperatures to form the low density cellular plastic materials will, in most instances, comprise our improved resin, a polyisocyanate and water, additives such as metallic soap powders, metallic leafing powders, and high molecular weight resinous additives being unnecessary for the production of the cellular plastic materials of the desired strength, density and cell structure. The avoidance of the need for the additives of course simplifies the mixing and manufacturing procedures and is conducive to more uniform results and products.

Another object of the invention is to provide improved alkyd resins intended for admixture with the polyisocyanate to obtain the reactant foaming compositions for producing low density, high strength cellular plastic reaction products which resins include in their formulations fatty acids that are bifunctional insofar as their reaction with meta-toluene diisocyanate is concerned. The fatty acids may be either hydroxy acids such as ricinoleic acid or dibasic acids such as dimerized fatty acids or dicarboxylic acids. We have found that such bifunctional fatty acids are effective in relatively small concentrations in the alkyd resins. In practice the simple admixture of pure or substantially pure meta-toluene diisocyanate and such an alkyd resin results in a foaming reactant composition that may be poured in a mold, cavity or structure, applied by spatula, dipping, spreading, or the like, or applied, deposited or spread in other ways to react and foam up and then set, harden and cure as strong, low-density cellular products of uniform cell structure, usually of small cell size and, if desired, resistant to relatively high temperatures.

The improved resins of the invention are, in general, prepared from one or more polyhydric alcohols, one or more dibasic acids and a bifunctional fatty acid. The polyhydric alcohols which we have found to be useful in preparing the resins are:

Trimethylol propane
Trimethylol ethane
Pentaerythritol
Sorbitol
Mannitol.

The trimethylol propane and trimethylol ethane may be employed as mixtures in the proportion range of from a modicum of trimethylol ethane with the balance of the mixture being trimethylol propane to a modicum of trimethylol propane with the balance of the mixture being trimethylol ethane. The alcohols, having a functionality greater than three per molecule, namely the pentaerythritol, sorbitol and mannitol, are used as modifying agents in the proportion of 5 to 40 mol percent based on the total mols of the polyhydric alcohol component. The dibasic acid or acids used in the formulations for the alkyd resins may include:

Oxalic acid
Adipic acid
Sebacic acid
Phthalic anhydride
Azelaic acid
Itaconic acid
Succinic acid
Terephthalic acid
Maleic anhydride.

The previously mentioned fatty acids that we employ in preparing the alkyd resins are characterized by the fact that they are bifunctional as respects the reaction with the meta-toluene diisocyanate of the reactant cellular foam producing mixture, that is they contain two reactive hydrogens per molecule. These fatty acids may be either hydroxy acids or dibasic acids such as dimerized fatty acids. The hydroxy fatty acids may either be saturated or unsaturated and include the group of such acids containing from 15 to 20 carbon atoms. Typical of such hydroxy fatty acids are:

Hydroxy palmitic acids
Hydroxy stearic acids
Ricinoleic acid.

The dibasic fatty acids above referred to (dicarboxylic acids) are dimerized, unsaturated fatty acids chosen from the octadecadienoic acids and preferably from the 9,12-octadecadienoic acid (linoleic acid) to form the dilinoleic acid. The preparation of the dibasic unsaturated acid (dilinoleic acid) may be represented diagrammatically by the Deils-Alder reaction as follows:

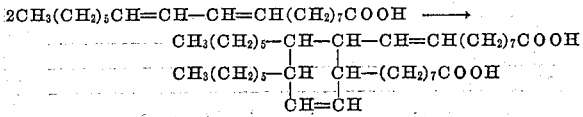

The improved alkyd resins of our invention are prepared to have the ratio of the OH and COOH groups of the alkyd resin reactants range between 1½ to 1 and 3½ to 1 respectively. A preferred ratio range of the hydroxyl to the carboxyl groups is 1 COOH to between 2 and 3 OH. The acid number of the alkyd resins is between 5 and 100 and preferably between 10 and 75. We have found that the best results are obtained when the mol percent of the fatty acid components of the alkyd resin based on the total number of acidic components is between 1 and 50 mol percent.

Illustrative and preferred examples of the alkyd resins of the invention are:

Resin A (acid number 20 to 40)

| | Mols |
|---|---|
| Trimethylol propane | 4 |
| Phthalic anhydride | 2½ |
| "Dimer acid" | ½ |

Resin B (acid number 20 to 40)

| | |
|---|---|
| Trimethylol propane | 4 |
| Adipic acid | 2 |
| Phthalic anhydride | ½ |
| "Dimer acid" | ½ |

Resin C (acid number 15 to 35)

| | |
|---|---|
| Trimethylol propane | 4 |
| Adipic acid | 2¼ |
| Phthalic anhydride | ½ |
| "Dimer acid" | ¼ |

Resin D (acid number 5 to 40)

| | |
|---|---|
| Trimethylol propane | 4 |
| Adipic acid | 1 |
| Phthalic anhydride | ½ |
| "Dimer acid" | ½ |

Resin E (acid number 50 to 75)

| | |
|---|---|
| Trimethylol propane | 4 |
| Adipic acid | 1 |
| Phthalic anhydride | 1½ |
| "Dimer acid" | ½ |

Resin F (acid number 5 to 40)

| | |
|---|---|
| Trimethylol propane, trimethylol ethane or mixtures thereof | 4 |
| Adipic acid | 2½ |
| Ricinoleic acid | 1 |

Resin G (acid number 20 to 40)

| | |
|---|---|
| Trimethylol propane | 4 |
| Adipic acid | 1 |
| Phthalic anhydride | ½ |
| "Dimer acid" | 1½ |

Resin H (acid number 15 to 40)

| | |
|---|---|
| Trimethylol propane | 4 |
| Phthalic anhydride | 1 |
| "Dimer acid" | 1 |
| Adipic acid | 1 |

Resin I (acid number 50 to 80)

| | |
|---|---|
| Trimethylol propane | 2½ |
| Pentaerythritol | 1 |
| Adipic acid | 1 |
| Phthalic anhydride | 1 |
| "Dimer acid" | 1 |

Resin J (acid number 75 to 100)

| | |
|---|---|
| Trimethylol propane | 2½ |
| Pentaerythritol | 1 |
| Adipic acid | 1¼ |
| Phthalic anhydride | 1 |
| "Dimer acid" | ¾ |

Resin K (acid number 15 to 30)

| | |
|---|---|
| Trimethylol propane | 4 |
| Adipic acid | 2 |
| Phthalic anhydride | ½ |
| Hydroxy palmitic acid | 1 |

Resin L (acid number 10 to 35)

| | |
|---|---|
| Trimethylol propane | 4 |
| Adipic acid | 2 |
| Phthalic anhydride | ½ |
| Ricinoleic acid | ¾ |

Resin M (acid number 15 to 40)

| | |
|---|---|
| Trimethylol propane | 4 |
| Adipic acid | ½ |
| Phthalic anhydride | 1 |
| "Dimer acid" | ½ |

Resin N (acid number 15 to 40)

| | |
|---|---|
| Trimethylol ethane | 4 |
| Adipic acid | 1 |
| Phthalic anhydride | ½ |
| "Dimer acid" | ½ |

Resin O (acid number 10 to 40)

| | |
|---|---|
| Trimethylol propane | 4 |
| Adipic acid | ½ |
| Phthalic anhydride | ½ |
| Maleic acid | ½ |
| "Dimer acid" | ½ |

Resin P (acid number 10 to 40)

| | |
|---|---|
| Trimethylol propane, trimethylol ethane or mixtures thereof | 4 |
| Succinic acid | 1 |
| Phthalic anhydride | ½ |
| "Dimer acid" | ½ |

Resin Q (acid number 15 to 45)

| | |
|---|---|
| Trimethylol propane, trimethylol ethane or mixtures thereof | 3 |
| Pentaerythritol | 1 |
| Adipic acid | 1 |
| Phthalic anhydride | ½ |
| "Dimer acid" | ½ |

Resin R (acid number 5 to 40)

| | |
|---|---|
| Trimethylol propane, trimethylol ethane or mixtures thereof | 4 |
| Adipic acid | 1½ |
| "Dimer acid" | ½ |

Resin S (acid number 5 to 40)

| | |
|---|---|
| Trimethylol propane / Trimethylol ethane } total of | 4 |
| Adipic acid | 1 |
| Phthalic anhydride | ½ |
| "Dimer acid" | ½ |

Resin T (acid number 5 to 40)

| | |
|---|---|
| Trimethylol propane / Trimethylol ethane } total of | 4 |
| Adipic acid | 1½ |
| Phthalic anhydride | ½ |
| "Dimer acid" | ⅟₁₆ |

Resin U (acid number 5 to 40)

| | |
|---|---|
| Trimethylol propane | 4 |
| Adipic acid | 2 |
| "Dimer acid" | ⅟₂₀ |

The dimer acid included in certain of the above examples of the alkyd resins is the dimerized linoleic acid (dilinoleic acid). The dimer acid is effective at relatively small concentrations. Thus we found that a reactant mixture prepared from Resin T having an acid number of about 20, where the ratio of the meta-toluene diisocyanate to the resin was 25:30 grams and where the total charge weight was 138 grams, produced an approximately nine inch rise of the cellular foam or plastic with a cross section of 6" x 1½", the foamed plastic having ultra small cells and being of excellent cell uniformity. In contrast a reactant mixture prepared from an alkyd resin the same as Resin T except for the omission of the dimer acid and having the same water content and acid number, with the ratio of the meta-toluene diisocyanate to the resin being the same (25:30 grams) and the total charge weight being the same (138 grams) produced only a two inch rise of the same cross section (6" x 1½") with the foamed plastic having large non-uniform cells.

In accordance with the invention the improved and simplified foaming reactant compositions for producing cellular plastics of selected low-density and of small cell size and excellent physical strength characteristics, are obtained or prepared by mixing together an alkyd resin, such as above described, a polyisocyanate and water. No modifiers, additives or catalysts are required to be added to or included in the composition.

The polyisocyanate of the reactant foaming mixture or composition is preferably meta-toluene diisocyanate. The meta-toluene diisocyanate is used in the proportion of from 35 to 130 parts by weight for each 100 parts by weight of the alkyd resin. The water component is only a small proportion or modicum included either in the alkyd resin components or as a separate ingredient. The total water content will usually range between 0.1 and 3% and preferably between 0.2 and 2% based on the weight of the alkyd resin component.

The following are typical illustrative examples of the reactant foaming mixtures or compositions of the invention:

EXAMPLE 1

Resin B, acid number 25—
1% water _____ parts by weight__ 30
Meta-toluene diisocyanate _____ do____ 20

EXAMPLE 2

Resin D, acid number 5—
1.25% water _____ parts by weight__ 30
Meta-toluene diisocyanate _____ do____ 30

EXAMPLE 3

Resin D, acid number 20—
0.75% water _____ parts by weight__ 30
Meta-toluene diisocyanate _____ do____ 25

EXAMPLE 4

Resin D, acid number 30—
0.65% water _____ parts by weight__ 30
Meta-toluene diisocyanate _____ do____ 20

EXAMPLE 5

Resin E, acid number 55—
0.85% water _____ parts by weight__ 30
Meta-toluene diisocyanate _____ do____ 20

EXAMPLE 6

Resin F, acid number 15—
1.50% water _____ parts by weight__ 30
Meta-toluene diisocyanate _____ do____ 15

EXAMPLE 7

Resin F, acid number 15—
1% water _____ parts by weight__ 30
Meta-toluene diisocyanate _____ do____ 25

EXAMPLE 8

Resin Q, acid number 45—
1% water _____ parts by weight__ 30
Meta-toluene diisocyanate _____ do____ 30

EXAMPLE 9

Resin G, acid number 30—
1.25% water _____ parts by weight__ 30
Meta-toluene diisocyanate _____ do____ 35

EXAMPLE 10

Resin S, acid number 20 _____ parts by weight__ 30
Water _____ gram__ .26
Meta-toluene diisocyanate _____ parts by weight__ 25

EXAMPLE 11

Resin T, acid number 15 _____ parts by weight__ 30
Water _____ gram__ .3
Meta-toluene diisocyanate _____ parts by weight__ 20

In preparing the reactant foaming mixtures the ingredients, namely the alkyd resin and the polyisocyanate with or without added water, are simply thoroughly mixed together and the mixture is then ready to be poured in place or otherwise applied. The poured or applied mixture is allowed to react at atmospheric pressure either with or without a moderate external heating at a temperature of, say, between 120° F. and 150° F. depending upon the size of the batch. The mixture is allowed to react and the reaction is allowed to go on to completion to produce the foamed cellular plastic product. A post-curing at temperatures between 120° F. and 300° F. and for up to twenty-four hours may be desirable in some instances although in other cases the exothermic heat is all that is required.

It should be understood that the invention is not to be regarded as limited to the express procedures or materials set forth, these details being given only by way of illustration and to aid in clarifying the invention. We do not regard such specific details as essential to the invention except insofar as they are expressed in the following claims in which it is our intention to claim the novelty inherent in the invention as broadly as is permissible in view of the prior art.

We claim:

1. The cellular material which is the product of reaction of a pourable foaming composition consisting essentially of an alkyd resin prepared from trimethylol propane, at least one dibasic acid selected from the group consisting of adipic acid, sebacic acid, phthalic anhydride, azelaic acid, itaconic acid, succinic acid, terephthalic acid, maleic anhydride and oxalic acid and a dimerized unsaturated fatty acid, the resin having an acid number of from 5 to 100 and having a ratio of the OH groups to COOH groups of from 1½:1 to 3½:1 respectively, the mol percentage of the fatty acid based on the total mols of the acidic components of the resin being from 1 to 50 mol percent; from 35 to 130 parts by weight of meta-toluene diisocyanate for each 100 parts by weight of the resin, and water in the amount of from 0.1 to 3% by weight based on the weight of the resin.

2. The cellular material which is the product of reaction of a foaming composition composed essentially of on an approximate parts by weight basis from 15 to 35 parts meta-toluene diisocyanate, from 0.06 to 0.6 part water and 30 parts of an alkyd resin having an acid number of from 5 to 40 prepared from 4 mols trimethylol propane, 1 mol adipic acid, ½ mol phthalic anhydride, and ½ mol dilinoleic acid.

3. The cellular material which is the reaction product of the foaming composition consisting of on an approximate parts by weight basis from 15 to 35 parts meta-toluene diisocyanate, and 30 parts of an alkyd resin having an acid number of from 5 to 40 prepared from 4 mols trimethylol propane, 1 mol adipic acid, ½ mol phthalic anhydride, ½ mol dilinoleic acid and water in the amount of from 0.1 to 3% by weight based on the weight of the resin.

4. The cellular material which is the product of reaction of a pourable foaming composition consisting of an alkyd resin prepared from trimethylol propane, at least one dibasic acid selected from the group consisting of adipic acid, sebacic acid, phthalic anhydride, azelaic acid, itaconic acid, succinic acid, terephthalic acid, maleic anhydride and oxalic acid and dilinoleic acid, the resin having an acid number of from 5 to 100 and having a ratio of the COOH groups to the OH groups of 1 COOH group to between 2 and 3 OH groups, the mol percentage of the fatty acid based on the total mols of the acidic components of the resin being from 1 to 50 mol percent; from 35 to 130 parts by weight of meta-toluene diisocyanate for each 100 parts by weight of the resin, and water in the amount of from 0.1 to 3% by weight based on the weight of the resin.

5. The cellular material which is the reaction product of a composition composed of on an approximate parts by weight basis substantially equal parts of meta-toluene diisocyanate and an alkyd resin having an acid number of from 5 to 40 prepared from 4 mols trimethylol propane, 1 mol adipic acid, ½ mol phthalic anhydride, ½ mol dilinoleic acid and water in the amount of from 0.1 to 3% by weight based on the weight of the resin.

6. The cellular material which is the reaction product of a composition consisting of an alkyd resin having an acid number of from 5 to 40 prepared from 4 mols trimethylol propane, 1 mol adipic acid, ½ mol phthalic anhydride and ½ mol dilinoleic acid, water in the amount of from 0.1 to 3% by weight based on the weight of the resin, and from 35 to 130 parts by weight of meta-toluene diisocyanate for each 100 parts by weight of the resin.

References Cited in the file of this patent

UNITED STATES PATENTS

| | | |
|---|---|---|
| 1,885,027 | Patterson | Oct. 25, 1932 |
| 2,533,270 | Finletter et al. | Dec. 12, 1950 |
| 2,577,279 | Simon et al. | Dec. 4, 1951 |
| 2,577,280 | Simon et al. | Dec. 4, 1951 |
| 2,577,381 | Stirnemann | Dec. 4, 1951 |
| 2,642,403 | Simon et al. | June 16, 1953 |
| 2,676,157 | Newell | Apr. 20, 1954 |